L. C. TRENT.
FILTERING APPARATUS.
APPLICATION FILED NOV. 15, 1910.
1,042,295.
Patented Oct. 22, 1912.
2 SHEETS—SHEET 1.
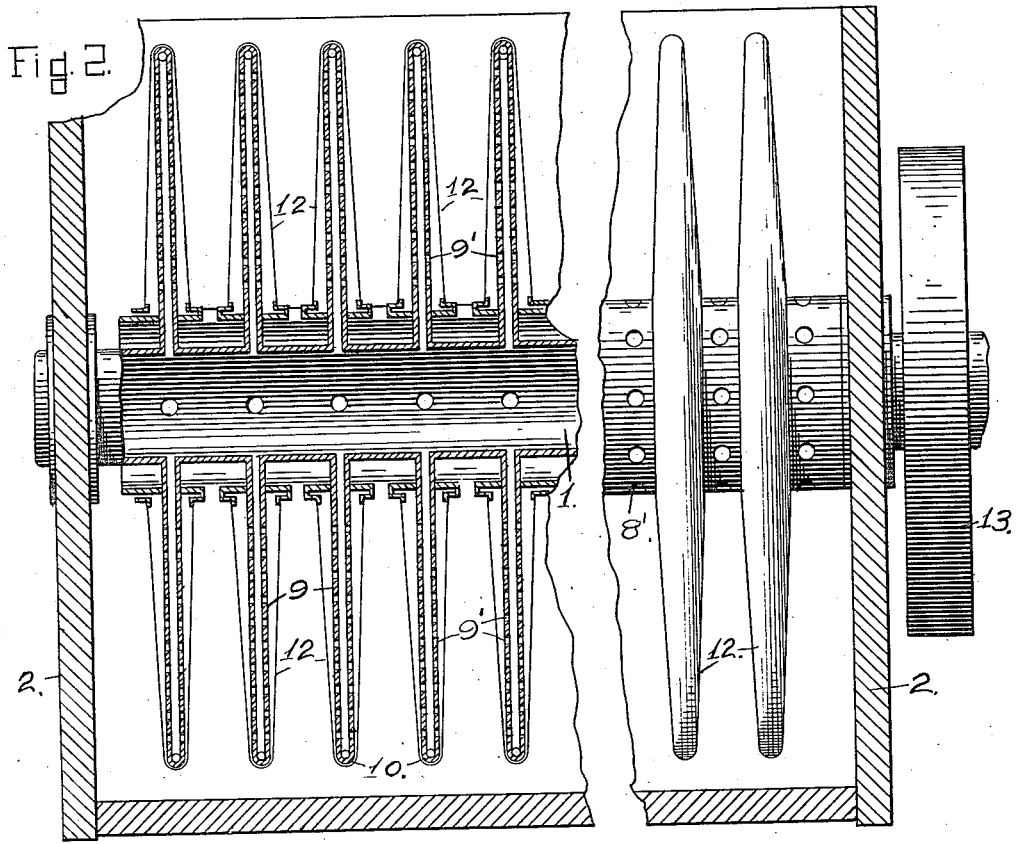
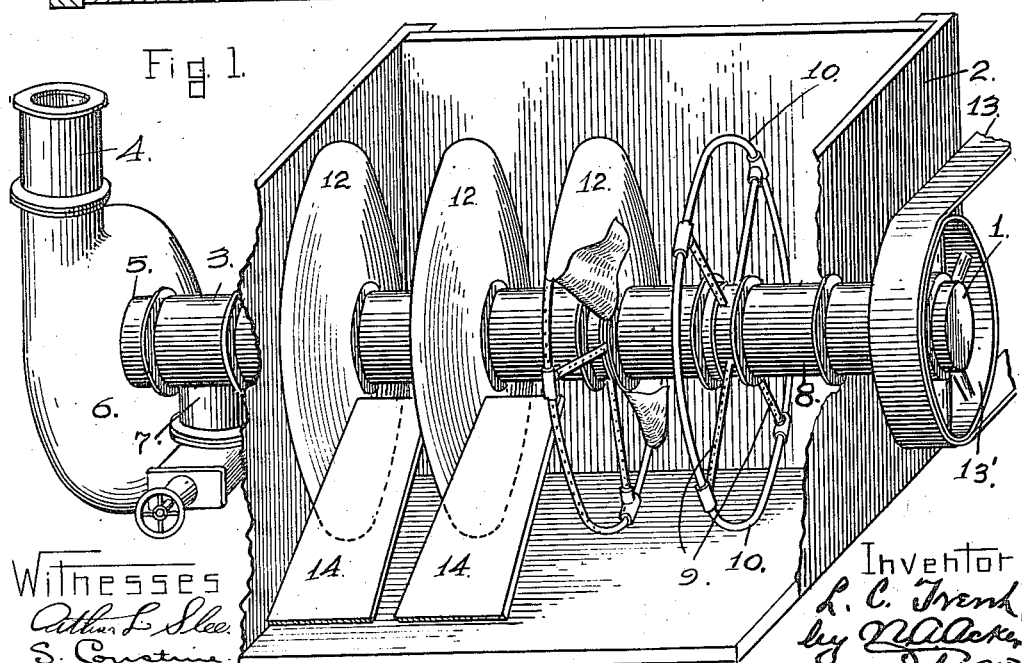

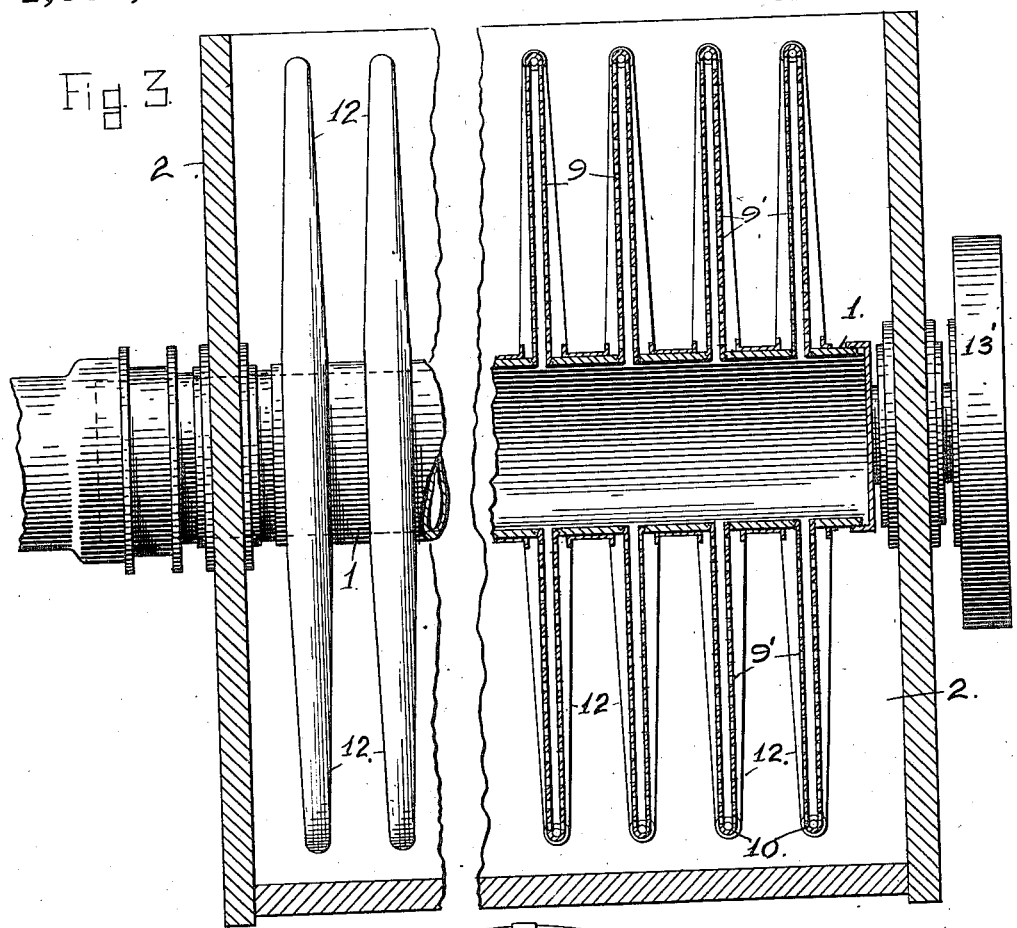
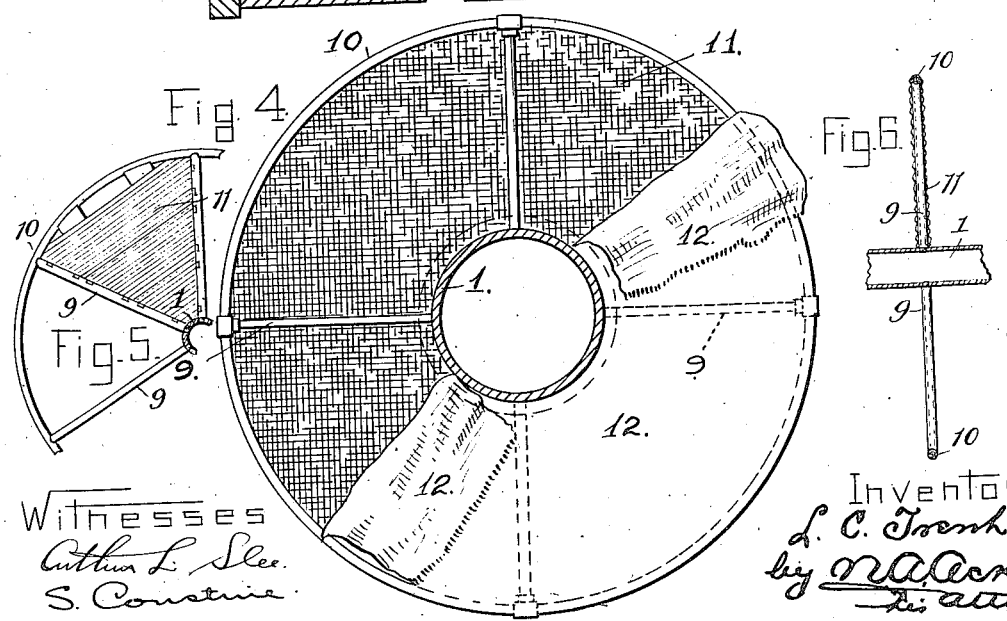

UNITED STATES PATENT OFFICE.

LAMARTINE C. TRENT, OF LOS ANGELES, CALIFORNIA.

FILTERING APPARATUS.

1,042,295.

Specification of Letters Patent.  Patented Oct. 22, 1912.

Application filed November 15, 1910.  Serial No. 592,428.

*To all whom it may concern:*

Be it known that I, LAMARTINE C. TRENT, a citizen of the United States, residing at Los Angeles, in the county of Los Angeles and State of California, have invented certain new and useful Improvements in Filtering Apparatus, of which the following is a specification.

The hereinafter described invention relates to an apparatus for separating solids from liquids generally, as for instance, cyanid solutions from slimes and pulverized ores, and lime and other sediments from saccharine liquors, and for purifying any and all kinds of liquids by removing the solids, impurities and foreign matter therefrom, although its use is mainly designed for removing the solids from water for the clarification thereof; the object of the invention being to obtain a large filtering area or surface for use within a limited space, thus securing compactness and the adaptability of the apparatus to location, wherein but limited room is obtainable for the working of a filter.

The apparatus as constructed is capable of use when entirely submerged, or when partially submerged within the liquid to be treated, and the same may be used in either an open or a closed reservoir, and when in use it may be employed as a primary apparatus for the removal of solids for the filtration or clarification of liquids, or its use may be employed in connection with a rotary drum filter for removing solids from liquids, in which case the hereinafter described filter may be considered as an auxiliary appliance.

To comprehend the invention, reference should be had to the accompanying sheets of drawings, wherein—

Figure 1 is a view in elevation partly broken away of the improved filter applied within a reservoir. Fig. 2 is a vertical sectional view parts being shown in elevation and the suction pump being removed. Fig. 3 is a similar view of the apparatus with the outer spaced water circulating jacket removed. Fig. 4 is a detail view of one of the filtering disks with its filtering cloth removed. Figs. 5 and 6 are detail views of a modified construction of filter member.

In its preferred form, the filtering apparatus comprises a central tubular or hollow shaft 1, mounted within suitable bearings in the reservoir 2, and connected at one end with the discharge outlet pipe 3, united to the delivery pipe 4 through the medium of the valved connection 5, into which the filtered liquid is drawn by means of the suction or other suitable type of pump 6. For purposes to be hereinafter explained, an auxiliary or fresh water supply pipe 7 is connected to the discharge outlet pipe, Fig. 1 of the drawings.

The hollow shaft 1 is surrounded or incased by an outer shell or casing 8 of somewhat larger diameter than the central shaft 1 in order to provide an annular circulating space therebetween, the said outer casing or shell being of less length than the said central shaft 1, and opens at each end, being held to and separated from the central shaft by the radial arms of the filter.

On the central shaft is secured a succession of parallel alined disks, each comprising a plurality of radial spokes or arms 9 formed of pipes united at their outer ends by a circumferential rim 10, consisting of a curved pipe. The radial spokes 9 are formed throughout the length thereof with circumferentially disposed perforations 9', and the tubular rim 10 is likewise perforated. The spokes 9 screw through openings in the outer shell or casing 8 and into the central shaft 1 to communicate with the interior thereof.

The radial spokes 9 and rim 10 form a spider composed of perforated pipes, the central shaft to which the spokes are united constituting the hub thereof. The spider thus formed is filled in between the spokes or radial arms with sections or segments 11 composed of any porous material, such as cocoanut matting suitable to convey water therethrough to the radial perforated pipe spokes or arms 9, Fig. 4 of the drawings, and these sections or segments may, if so desired, be corrugated or fluted as shown in the detail view of Fig. 5. The spider is then covered with an outer filtering cloth surface 12, which envelops or incases the entire spider, producing two filtering sides or faces for each constructed disk.

Rotation is imparted to the central shaft 1 in any suitable manner, preferably by means of a power belt 13, driven from a suitable source of power working over a belt pulley 13' secured to the projecting end of the central shaft. However, the means employed for imparting rotation to the central shaft and the plurality of alined filtering disks carried thereby is an immaterial feature, for obviously such may be varied as desired.

When in use the filter as thus constructed may be wholly, or partially submerged within a body of liquid to be filtered contained in the reservoir 2. During rotation of the filter water is drawn through the filtering disks into the hollow central shaft 1 by means of the pump 6. The liquid is pressed against the filtering surfaces of the series of filtering disks and drawn through the perforations of the covered spiders into the central shaft 1, the solids remaining on the outer filtering surfaces of the disks. During such rotation of the filter disks, liquid contained within the reservoir will flow within the open ends of the outer casing or shell 8 and escaping through the outlet orifices 8' therein passes to the filter disks, thus setting up a circulation of the liquid from the center of the filter disks to their outer periphery and by so doing maintaining a circulation of the material to be filtered and allowing the solids and liquids to travel in one direction, the tendency of such outward circulation, due somewhat to the centrifugal action produced by the rotation of the filter, is to carry the cake or accumulation away from the filter disks. However, the inclosing casing or shell for the central shaft may be dispensed with, if so desired, and in Fig. 3 of the drawings the same has been omitted. While the employment of the outer shell or casing, on account of the reverse circulation produced thereby, is preferred in the treatment of certain liquids, it is not essential to the practical working of the filter.

To prevent the too rapid accumulation of solids or cakes on the filtering surfaces of the disks, a fixed scraper 14 is interposed between the filter disks, which as the disks revolve bear against the solids which have accumulated by adhering to the filtering surfaces and are scraped off and pushed to one side. In fact, if the filter is revolved at a high speed, the motion created thereby tends to break down and throw the cake away from the filtering disks.

In case the cake adhering to the surface of the filtering disks impedes materially the filtration of the water from which the solids are to be removed, not being displayed by the employment of the scrapers and the rotary action of the filter, the same may be broken down and removed by inducing a reverse flow of liquid through the filter disks from the inside of the central shaft, which is accomplished by closing down for a short while the filtering action and admitting water under pressure into the central shaft through the auxiliary or fresh water supply pipe 7, which water is forced through the filtering disks from the inside and acting against the cake on the outer surface thereof breaks down the same, the solids thus released falling into the tank or reservoir 2. However the reverse current may be created, the purpose thereof is to break down the accumulated cake in order to clean the obstructions out of the filtering cloth, and this has proven in practice to be essential at times, as in the case where the object is to filter liquid, the recovery of the solids being of no importance.

The described apparatus has proven of value in connection with the work of removing or separating the carbon from water flowing from gas scrubbers, wherein it has been employed as an auxiliary to the large filtering drums utilized for such purposes, its large filtering area and compactness allowing a much larger flow of water to be handled than can be taken care of by the filtering drums commonly employed. Practice has determined that while the rotary drum filter will handle from two to three hundred gallons of water per minute, the herein described disk or "pancake" filter will successfully handle approximately two thousand gallons per minute, due to the fact that each of said filters is composed of about forty-two disks spaced about four inches apart, mounted on a common central shaft, of a length equal to the width of a drum filter, giving approximately fifteen hundred feet of filtering area, as against three hundred feet of filtering area of the drum filter. Its value as an adjunct to the drum filter will thus be readily appreciated.

The improved filter will be found of importance and value for placing in turbid streams to filter the water before going to the water works pumps or in fact any pump taking a turbid stream from its source of supply.

The filter is thus adapted for the successful removal of solids, foreign substances and impurities from water for filtration purposes, and equally so for the removal or separation of liquids from pulp generally, in fact, its use is adapted for all purposes where solids are to be separated.

Various changes may be made in the details of construction without departing from the spirit of the invention, and the intent is not to confine the same to the detailed arrangement shown and described.

While in the present case the filter has been described for use in connection with a pump for drawing the liquid to be filtered through the filtering disks into the central tubular shaft, such is only for the purpose of securing a large and rapid output of the liquid, and in the treatment of certain liquids, as for instance water, the suction pump may be eliminated and the filtering carried out by the head pressure of the liquid. Again, while the filter is disclosed in horizontal position relative to the reservoir or tank within which it is situated, it is obvious that the position may be varied as practice may determine expedient for the material to be treated.

Having thus described the invention what is claimed as new and desired to protect by Letters Patent is—

1. A filter for the described purpose, the same comprising a central hollow shaft, a plurality of alined filtering disks mounted thereon each composed of a series of hollow perforated radially extended arms communicating with the interior of the central shaft and united by an outer rim, incased with filtering cloth, and means for inducing a reverse circulation of the liquid being treated, including an apertured casing overlying the shaft and movable therewith.

2. A filter for the described purpose, the same comprising a central hollow shaft and a plurality of alined filtering disks mounted thereon, each consisting of a spider formed of a series of hollow perforated arms radially extended from the central shaft and in communication with the interior thereof, an outer rim uniting the said arms, a filtering covering incasing the spider frame of each disk, and a perforated casing surrounding the hollow shaft and spaced therefrom, the casing being supported upon the radial arms.

3. A filter for the described purpose, the same comprising a central hollow shaft and a plurality of alined filtering disks, each consisting of a spider formed of a plurality of hollow perforated arms radially extended from the central shaft and in communication with the interior thereof, an outer arm uniting the radial arms, a plurality of segmental shaped solid disk members of porous material one for each face between the radial arms and a filtering covering common to all of said sheets and incasing the spider frame.

4. A filter for the described purpose, the same comprising a central hollow shaft, a plurality of alined spiders mounted thereon each formed of a series of hollow perforated arms radially extended from said central shaft and communicating with the interior thereof, a porous corrugated segmental shaped filling held in the space between each of said arms, and a filtering covering incasing each of the said spider frames.

5. A filter for the described purpose, the same comprising a central hollow shaft, a surrounding casing upon the shaft and separated from the latter so as to form an intervening space substantially from end to end of the shaft, and said casing having openings therein substantially throughout its length arranged in annular series, and a plurality of alined filter disks mounted on the shaft and independently communicating with the interior of the shaft, said disks including a series of hollow perforated arms radially extended from said shaft and secured to the latter and passing through the surrounding casing whereby to constitute supports for the latter, and a porous covering for said disks.

6. An apparatus for the described purpose, the same comprising a central hollow shaft, devices for imparting rotation thereto, a plurality of alined filter disks mounted thereon and independently communicating with the interior thereof, means for drawing liquid through the filter disks into the central shaft and discharging the indrawn liquid from the said shaft, and an apertured tubular member surrounding the shaft and spaced therefrom.

7. An apparatus for the described purpose, the same comprising a central hollow shaft, devices for imparting rotation thereto, a plurality of alined filter disks mounted thereon and independently communicating with the interior thereof, a series of scrapers interposed between the filtering disks, means for drawing liquid through the filtering disks into the central shaft and discharging the indrawn liquid from the said shaft, and an apertured casing surrounding the shaft and spaced therefrom.

8. A filter for the described purpose, the same comprising a hollow shaft, a surrounding apertured casing separated therefrom to form an intervening space substantially from end to end of the shaft, a plurality of alined filter disks mounted thereon and independently communicating with the interior of the shaft by passing through said casing, an inclosing tank for said disks, the shaft projecting at opposite ends through the tank, means for imparting rotation to the shaft mounted at one end thereof without the tank, vacuum creating means at the opposite end of the shaft and without the tank, and a liquid inlet for the shaft intermediate said vacuum creating means and the end of the tank whereby liquid may be forced under pressure into said shaft, substantially as and for the purpose described.

In testimony whereof I have signed my name to this specification in presence of two subscribing witnesses.

LAMARTINE C. TRENT.

Witnesses:
N. A. ACKER,
D. B. RICHARDS.